(12) United States Patent
Su et al.

(10) Patent No.: US 8,144,253 B2
(45) Date of Patent: Mar. 27, 2012

(54) MULTI-FRAME APPROACH FOR IMAGE UPSCALING

(75) Inventors: Yeping Su, Camas, WA (US); Hao Pan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 394 days.

(21) Appl. No.: 12/460,515

(22) Filed: Jul. 21, 2009

(65) Prior Publication Data

US 2011/0019082 A1 Jan. 27, 2011

(51) Int. Cl.
*H04N 9/64* (2006.01)
*H04N 5/00* (2011.01)
*G06K 9/36* (2006.01)

(52) U.S. Cl. .......................... 348/607; 348/575; 382/236
(58) Field of Classification Search .......................... None
See application file for complete search history.

(56) References Cited

U.S. PATENT DOCUMENTS

| | | | | |
|---|---|---|---|---|
| 4,463,381 A | * | 7/1984 | Powell et al. | 348/625 |
| 5,422,827 A | * | 6/1995 | Niehaus | 702/190 |
| 5,621,468 A | * | 4/1997 | Kim | 375/240.16 |
| 6,157,396 A | * | 12/2000 | Margulis et al. | 345/506 |
| 7,268,821 B2 | | 9/2007 | Lufkin | |
| 7,420,618 B2 | | 9/2008 | Swartz | |
| 2005/0123214 A1 | | 6/2005 | Takahira | |

FOREIGN PATENT DOCUMENTS

| | | |
|---|---|---|
| JP | 2006-229749 | 8/2006 |
| JP | 2006-246200 | 9/2006 |
| WO | WO 2007-089803 | 8/2007 |

OTHER PUBLICATIONS

English abstract of JP 2006-229749; pp. 1-19.
English abstract of JP 2006-246200; pp. 1-25.
Dufaux, F. and Moscheni, F., *Motion estimation techniques for digital* TV: A review and a new contribution, Proc. IEEE, vol. 83, pp. 858-876, Jun. 1995.
Perona, P., and Malik, J., "Scale-space and Edge Detection Using Anisotropic Diffusion", IEEE Transactions on Pattern Analysis and Machine Intelligence, vol. 12, No. 7, Jul. 2000.
Saint-Marc, P., et al., "Adaptive Smoothing: A General Tool for Early Vision," IEEE Trans. Pattern Analysis and Machine Intelligence, vol. 13, 1991.
Tomasi, C. and Manduchi, R., "Bilateral Filtering for gray and color images", Sixth International Conference on Computer Vision, pp. 839-846, New Delhi, India, 1998.

* cited by examiner

*Primary Examiner* — Brian Yenke
*Assistant Examiner* — Michael Teitelbaum
(74) *Attorney, Agent, or Firm* — Chernoff, Vilhauer, McClung & Stenzel

(57) ABSTRACT

Video upscaling may be performed by effectively combining several different image processing techniques. The video is processed using temporal based motion estimation and subsequently filtered using a spatial filter. The spatially filtered image is sharpened and noise is suppressed. Also, the images in the video are upscaled.

32 Claims, 4 Drawing Sheets

MULTI-FRAME APPROACH FOR IMAGE UPSCALING

CROSS-REFERENCE TO RELATED APPLICATIONS

None

BACKGROUND OF THE INVENTION

The present invention relates to a system for increasing the spatial resolution of a video.

The resolution of a typical liquid crystal display is approximately 720×480 which is on the order of standard definition television. The resolution of a typical high resolution diagonal display is 4096×2048 and typically has viewing distances that are less than 2 picture heights. In order to display a lower resolution image on a higher resolution display, the lower resolution image is upscaled. Large high resolution displays viewed at close viewing distances tend to have annoying artifacts as a result of the upsampling. In addition, due to the limited information in the original video content this upsampling tends to result in noise.

One type of upscaling technology involves an edge adaptive spatial filter technique that locates the edges and contours within the incoming image and controls the filtering process near the edges. These techniques can produce an upsampled image with sharp natural looking edge contours. However, edge adaptive upsampling techniques tend to blur textures. Another drawback of edge adaptive techniques is that they can mistake non-edge features for edges as a result of edge classification. This introduces local spurious edges that are not in the original, and that are very easily observed as mistakes.

Another type of image modification technique that may be used to improve the quality of the perceived image is a sharpening technique, such as an unsharp mask. The unsharp mask increases the apparent sharpness of an image by using a blurred positive to create a mask of the original image. The unsharp mask is then combined with the negative to create the illusion that the resulting image is sharper than the original. In general, the unsharp masks amplifies the higher frequency components of the image.

Another type of image modification technique that may be used to improve the quality of the perceived image is a noise reduction technique. The noise reduction may be achieved using a low-pass smoothing filter. Unfortunately, the smoothing filter tends to blur the image, so non-linear noise reduction filters may be preferred to reduce the blurring. Other types of filters include an anisotropic diffusion filter and a median filter.

The foregoing and other objectives, features, and advantages of the invention will be more readily understood upon consideration of the following detailed description of the invention, taken in conjunction with the accompanying drawings

DETAILED DESCRIPTION OF PREFERRED EMBODIMENT

Figure 1:
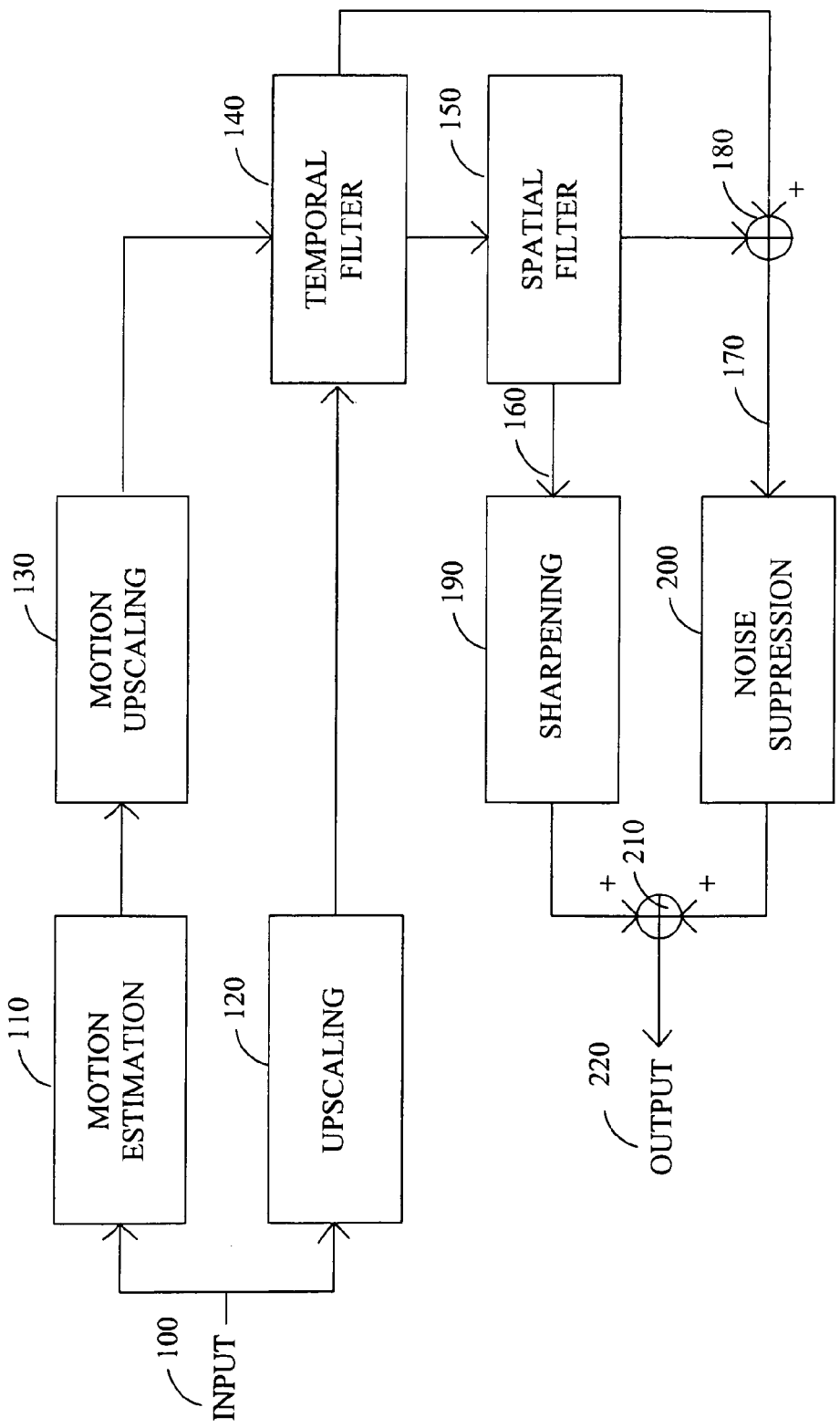
FIG. 1 illustrates an image upscaling technique.

Referring to FIG. 1, one technique for increasing the spatial resolution of an image is illustrated. An input image 100 is received as an input. By way of example, resolution may be generally referred to as the size in pixels of a display medium; the pixels per unit of length (e.g., 45 dots per inch, 300 dots per inch); pixels per screen height or width; and/or pixels per degree of angle subtended on the retina. By way of further example, the enhancement of the resolution may correspond to the increase in the information content. Also, increasing the resolution may refer to adding of frequency components in newly available high spatial frequency bands created as a result of the upsampling (e.g., denser sampling grid). The enhancement of the resolution of the image as a result of upsampling may improve the ability to resolve the actual scene information from the input image.

In a video sequence, different objects in the video such as birds, tend to move from one position to another position within the video sequence. To upscale the video sequence, the system should perform motion estimation 110 to account for temporal motion within the video sequence. The motion estimation 110 should be performed on the image data at the same resolution as the input image 100 to reduce the likelihood of detecting false motion as a result of upsampling the image data. Accordingly, any errors in the upsampled data does not introduce false motion into the data. Also, performing the motion estimation on the input image data reduces the computational complexity, as compared to performing the motion estimation on upsampled image data. The motion estimation may use any suitable technique, such as for example, optical flow, block matching, and frequency domain analysis.

The motion estimation 110 may determine motion vectors relating pixels in the current frame to pixels in the adjacent frame (or other frame, but temporal in nature) in a video sequence. Consider two two-dimensional images I(i, j,t), where i and j denote spatial coordinates of a pixel location and t denotes the time index. For each pixel in the current frame I(i, j,t) the motion estimation specifies a vector $m_{i,j,k} = [v_{i,j,k}, u_{i,j,k}]^T$, which measures the spatial displacement between the pixel location $(i+v_{i,j,k}, j+u_{i,j,k}, t+k)$ and the pixel location $(i,j,t)$. The motion vectors may have fractional pixel displacements, which is beneficial in achieving significant resolution enhancement.

For each (or selected) frame of the video sequence, the frame may be upscaled using an intra-frame image upscaling technique 120. By upscaling the input image 100, the other subsequent image processing operations may operate on the upscaled data. In this manner, subsequent filtering will likewise operate on the upscaled data which improves the image quality. In general, the image upscaling 120 converts a lower-resolution input image to a higher-resolution output image. For example, both linear upscaling techniques (such as bicubic or Lanczos) and nonlinear techniques may be used.

The output of the image upscaling 120 and the output of the motion estimation 110 are at different resolutions which makes subsequent joint processing of the output of the image scaling 120 and the motion estimation 110 problematic. In order to make subsequent joint processing more feasible, the output of the motion estimation 110 is motion upscaled 130 to the same resolution as the output of the image upscaling 120.

Temporal noise tends to occur in video, such as noise that manifests itself over a plurality of frames. In essence, temporal noise is noise that occurs in frames in a temporal manner that is not fully correlated with noise that occurs within a single frame. For example, one source of temporal noise is the result of thermal noise in charge coupled image sensing devices. A temporal filter 140 based upon the output of the motion upscaling 130 and the image upscaling 120 may be used to reduce the temporal noise in the video.

One example of a temporal filter 140 is a motion compensated temporal filter (MCTF). The MCTF may use a filtering process that is applied along estimated motion trajectories across multiple video frames:

$$O(i, j, t) = \sum_{k=-K}^{K} f_{i,j,k} \cdot \tilde{I}(i + v_{i,j,k}, j + u_{i,j,k}, t + k).$$

The principal goal of MCTF is temporal noise reduction, which reduces temporal inconsistencies with motion being taken into account. MCTF can also help achieve significant upsampling, since it blends in information from multiple frames. The MCTF may use motion vectors $[v_{i,j,k}, u_{i,j,k}]^T$ that have fractional pixel accuracy, sub-pixel interpolation may be used to obtain motion compensated intensity $\tilde{I}(i+v_{i,j,k}, j+u_{i,j,k}, t+k)$ from I. Motion estimation is subject to inaccuracies and errors (e.g., due to occlusions), which could lead to motion blur and other motion artifacts after MCTF. In order to reduce such problems, the design of temporal filter weights $f_{i,j,k}$ may be made aware of and robust against imperfections in the motion estimation module. One example, is the use of mean square error (MSE) of the displaced frame difference between two motion-aligned windows as an indication of motion vector accuracy. Such MSE is then converted to filter weights through a monotonically decreasing function. As one possible embodiment using exponential function, the filter weights are computed as $$f_{i,j,k} = \frac{e^{-\frac{MSE_{i,j,k}}{2\sigma_t^2}}}{\sum_{k=-K}^{K} e^{-\frac{MSE_{i,j,k}}{2\sigma_t^2}}}$$

and the MSE is calculated over a local window $$MSE_{i,j,k} = \frac{1}{(2d+1)^2} \sum_{m=i-d}^{i+d} \sum_{n=j-d}^{j+d} \left( I(m, n, t) - \tilde{I}\begin{pmatrix} m + v_{m,n,k}, \\ n + u_{m,n,k}, t + k \end{pmatrix} \right)^2.$$

With an upscaled image 120 that is motion compensated using a temporal filter 140, the temporal aspects of the filtering is accomplished. In essence, the resulting video frames are upscaled and motion compensated, and thus suitable for subsequent intra-frame filtering. The noise in the resulting image from the temporal filter 140 tends to be in the high frequency portions of the image. Noise suppression based filtering tends to attenuate the high frequency portions of the image containing the noise.

Unfortunately, the noise suppression based filtering also tends to attenuate the desirable texture in the image. Similarly, image sharpening tends to amplify the high frequency portions of the image containing the noise.

In order to simultaneously achieve image sharpening and noise suppression, the image from the temporal filter 140 is preferably separated into a pair of different images using a spatial filter 150. The first image 160 includes the lower frequency portions of the image together with the sharp edges of the image. In essence, the first image 160 appears generally like a cartoon image. The second image 170 includes the higher frequency portions of the image, which is primarily the texture of the image without the sharp images contained in the first image 160. The second image 170 may be calculated based upon a subtraction operation 180 of the output of the spatial filter 150 and the input of the spatial filter.

The spatial filter 150 may be generally an edge adaptive smoothing filter that applies signal dependent processing to separate strong object edges from fine texture and noises. As one example, the system may use a bi-lateral, an anisotropic diffusion, an adaptive smoothing, or a sigma filter. In general, any operation that preserves edge features while removing higher frequency aspects may be used (or vice versa).

An image sharpening 190 technique may be used on the lower frequency portions of the image (with sharp edges) 150. Thus, the significant sharp edges of the image are sharpened and the lower frequency portions of the image are generally not sharpened. Since the lower frequency portions of the image do not tend to have significant noise, the noise in the image is likewise not enhanced. By way of example, an unsharp mask may be used.

A noise suppression 200 technique may be used on the higher frequency portions of the image. The higher frequencies tend to contain most of the noise in the image which is attenuated by the noise suppression 200. By way of example, a global weighting may be used to suppress noise and artifacts in the image, or a spatially variant weighting technique.

The sharpened image and the noise suppressed image are combined 210 to provide an upscaled output image 220. As it may be observed, the spatial filter 150, image sharpening 190, and noise suppression 200, all occur after the video is processed to reduce issues related to temporal noise and motion. This avoids the temporal noise and motion introducing errors in the image sharpening 190 and noise suppression 200.

Figure 2:
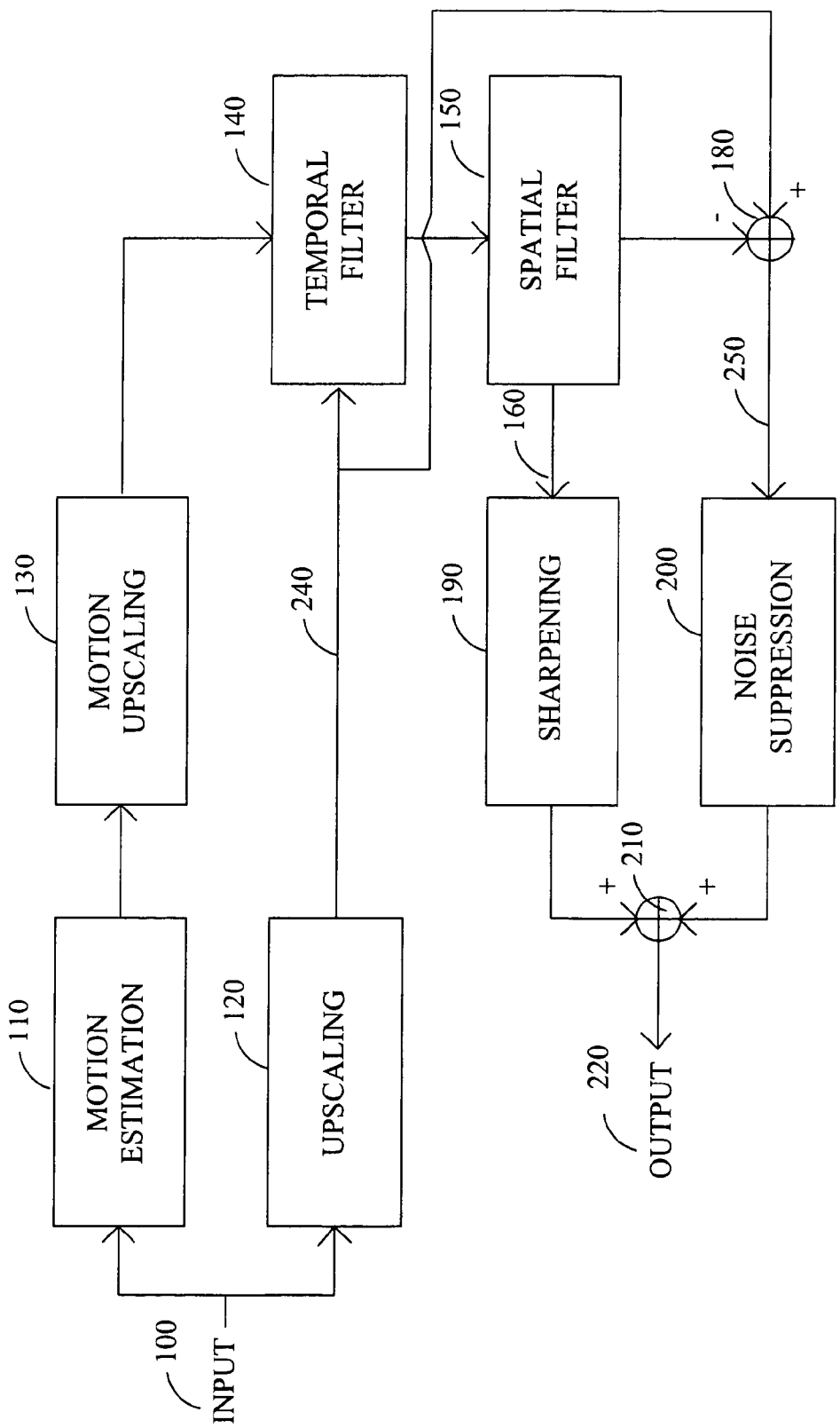
FIG. 2 illustrates another image upscaling technique.

The temporal filter 140, while reducing temporal noise in the images, also tends to attenuate some of the desirable texture in the image. In addition, the spatial filter 150 in combination with the noise suppression 200 reduces noise in the images, but also attenuates much of the desirable texture in the image. Accordingly, it may be desirable to reduce the amount of desirable texture that is attenuated among the various aspects of the image processing. Referring to FIG. 2, one technique to reduce the texture attention as a result of the temporal filter 140 is to use the input 240 to generate the for the subsequent noise suppression 200. The modified second image 250 includes the higher frequency portions of the image, which is primarily the texture of the image without the sharp images contained in the first image 160. The second image 250 may be calculated based upon a subtraction operation 180 of the output of the spatial filter 150 and the input of the temporal filter.

Figure 3:
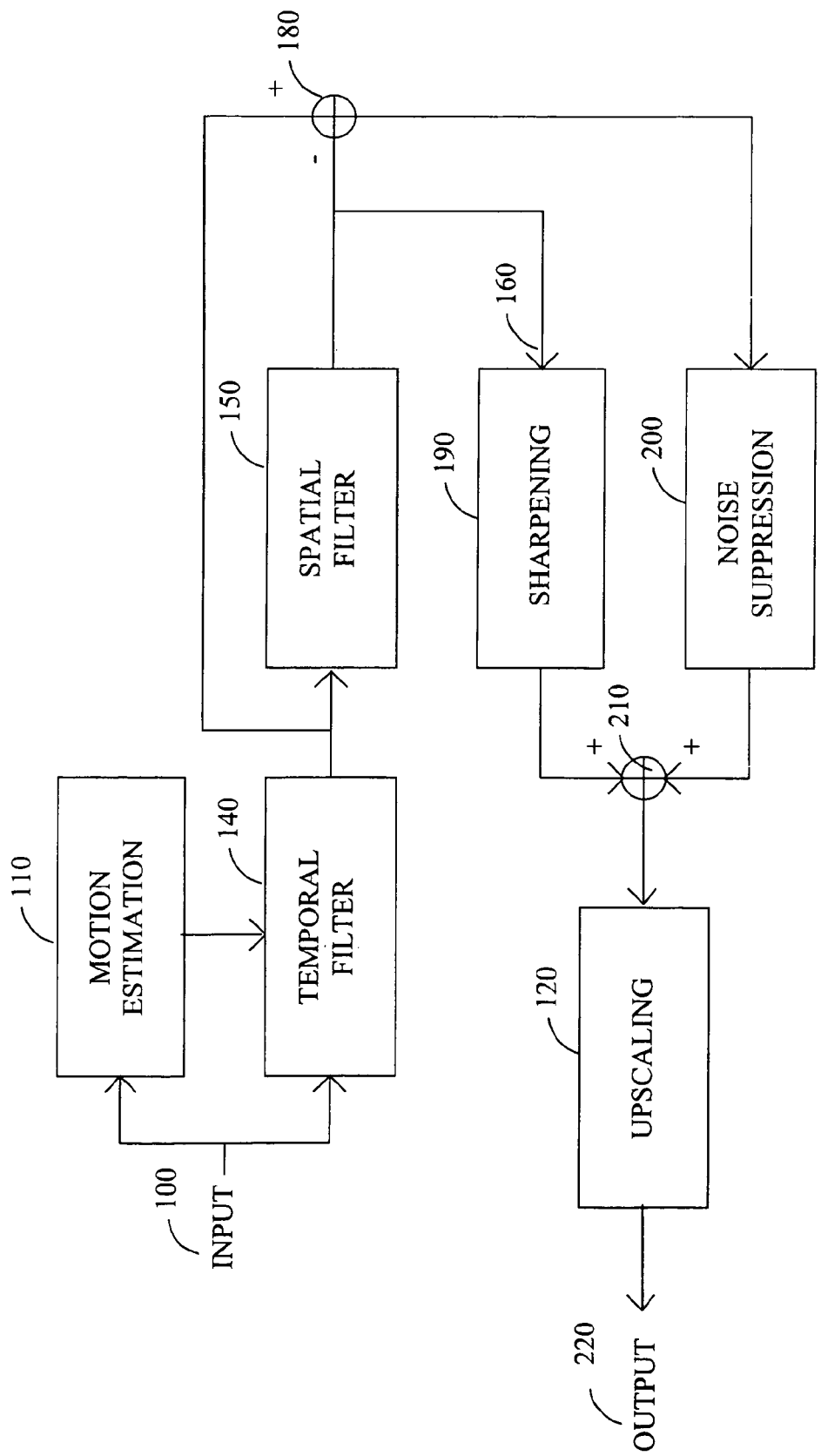
FIG. 3 illustrates another image upscaling technique.
Figure 4:
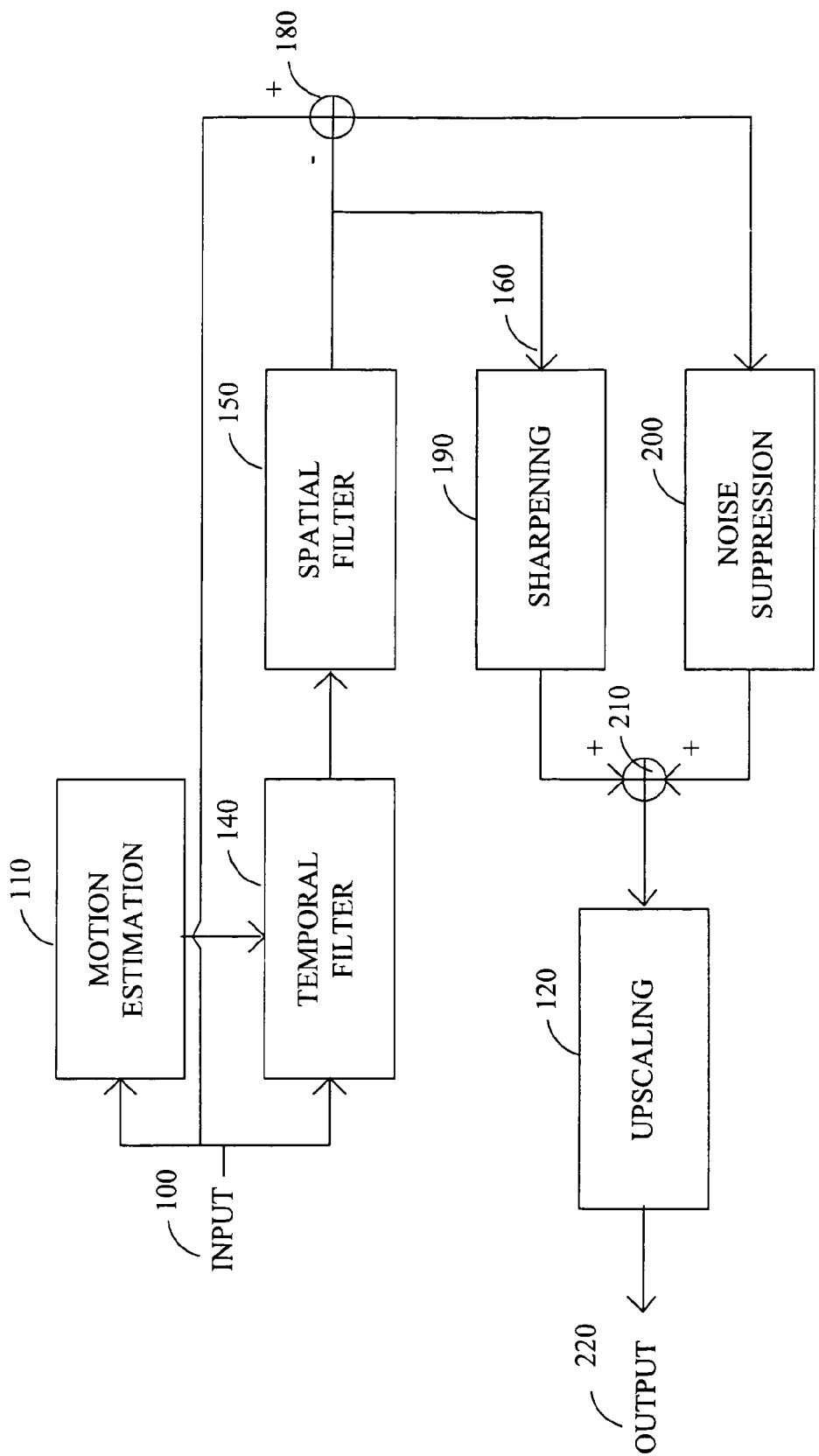
FIG. 4 illustrates another image upscaling technique.

Referring to FIGS. 3 and 4, in some cases the computational complexity of initially upscaling the image and then performing subsequent processing is burdensome. In this case, the image upscaling 120 may be performed after the noise suppression 200 and image sharpening 190. In this manner, the motion estimation 110 and filtering 140, 150, 190, and 200 is computationally more efficient.

The image upscaling 120 may provide edge characteristics and other types of image characteristics to other modules, such as for example, the amount of texture, the type of texture, an estimate of the amount of noise, the type of noise, color characteristics of the image, and spatial characteristics of the image. The edge characteristics from the image upscaling 120 may be provided to other modules, such as the temporal filter 140, to modify the temporal filtering. By way of example, a more aggressive temporal filtering may be suitable where there are no significant edge characteristics in the image.

The motion estimation 110 may provide motion information and other types of image characteristics. The motion information from the motion estimation 110 may be provided to other modules, such as the spatial filter 150, to modify the spatial filtering. By way of example, more aggressive spatial filtering may be suitable where the motion is less.

In general, any of the modules of the technique may determine image characteristics related to the image and provide this information to any other module, which is used to modify the processing.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for modifying a video comprising:
   (a) receiving a plurality of frames of said video;
   (b) estimating motion between portions of at least two frames of said video;
   (c) based upon said motion estimation motion compensated temporally filtering said video to reduce noise in a frame of said video;
   (d) spatially filtering said motion compensated temporally filtered frame of said video in such a manner that a first channel of said frame includes lower frequency portions of said image together with object edges; and a second channel of
   said frame includes higher frequency portions of said image;
   (e) sharpening said first channel of said frame and not sharpening said second channel;
   (f) attenuating noise of said second channel of said frame;
   (g) upscaling said frame of said video;
   (h) combining said sharpened first channel and said attenuated second channel.

2. The method of claim 1 wherein said motion estimation is based upon motion vectors.

3. The method of claim 1 wherein said motion estimation is based upon at least one of optical flow, block matching, and frequency domain analysis.

4. The method of claim 1 wherein said motion estimation is performed at the same resolution as the video.

5. The method of claim 1 wherein said motion estimation includes fractional pixel displacements.

6. The method of claim 1 wherein said upscaling of said frame of said video is based upon said received frame of said video and is used by said motion compensated temporal filter.

7. The method of claim 6 wherein said upscaling is an intra-frame technique.

8. The method of claim 1 wherein said upscaling of said frame of said video is based upon said combined first channel and said second channel.

9. The method of claim 8 wherein said upscaling is an intra-frame technique.

10. The method of claim 6 wherein motion estimation is scaled to the same resolution as said upscaling.

11. The method of claim 1 wherein said motion compensated temporal filter includes fractional pixel displacements.

12. The method of claim 1 wherein said spatial filter is an edge adaptive smoothing filter.

13. The method of claim 1 wherein said spatial filter is at least one of a bi-lateral filter, an anisotropic diffusion filter, an adaptive smoothing filter, and a sigma filter.

14. The method of claim 1 wherein said sharpening uses an unsharp mask.

15. The method of claim 1 wherein said second channel is based upon the input to said spatial filter.

16. The method of claim 1 wherein said second channel is based upon the input to said motion compensated temporal filter.

17. A method for modifying a video comprising:
   (a) receiving a plurality of frames of said video;
   (b) estimating motion between portions of at least two frames of said video;
   (c) based upon said motion estimation motion compensated temporally filtering said video to reduce noise in a frame of said video;
   (d) spatially filtering said motion compensated temporally filtered frame of said video in such a manner that a first channel of said frame includes primarily cartoon portions of said image together with object edges; and a second channel of
   said frame includes primarily texture portions of said image;
   (e) sharpening said first channel of said frame and not sharpening said second channel;
   (f) attenuating noise of said second channel of said frame;
   (g) upscaling said frame of said video;
   (h) combining said sharpened first channel and said attenuated second channel.

18. The method of claim 17 wherein said motion estimation is based upon motion vectors.

19. The method of claim 17 wherein said motion estimation is based upon at least one of optical flow, block matching, and frequency domain analysis.

20. The method of claim 17 wherein said motion estimation is performed at the same resolution as the video.

21. The method of claim 17 wherein said motion estimation includes fractional pixel displacements.

22. The method of claim 17 wherein said upscaling of said frame of said video is based upon said received frame of said video and is used by said motion compensated temporal filter.

23. The method of claim 22 wherein said upscaling is an intra-frame technique.

24. The method of claim 17 wherein said upscaling of said frame of said video is based upon said combined first channel and said second channel.

25. The method of claim 24 wherein said upscaling is an intra-frame technique.

26. The method of claim 22 wherein motion estimation is scaled to the same resolution as said upscaling.

27. The method of claim 17 wherein said motion compensated temporal filter includes fractional pixel displacements.

28. The method of claim 17 wherein said spatial filter is an edge adaptive smoothing filter.

29. The method of claim 17 wherein said spatial filter is at least one of a bi-lateral filter, an anisotropic diffusion filter, an adaptive smoothing filter, and a sigma filter.

30. The method of claim 17 wherein said sharpening uses an unsharp mask.

31. The method of claim 17 wherein said second channel is based upon the input to said spatial filter.

32. The method of claim 17 wherein said second channel is based upon the input to said motion compensated temporal filter.

* * * * *